United States Patent [19]

[11] 3,856,382
[45] Dec. 24, 1974

[54] BALLISTIC LINEAR BIDIRECTIONAL SCANNER SYSTEM

[73] Assignee: Midland Capital Corporation, New York, N.Y.

[22] Filed: June 12, 1972

[21] Appl. No.: 261,727

[52] U.S. Cl.................. 350/285, 350/6, 331/154
[51] Int. Cl............................................. G02f 1/34
[58] Field of Search.......... 310/12; 331/154; 350/6, 350/7, 285

[56] References Cited
UNITED STATES PATENTS

| | | | |
|---|---|---|---|
| 1,702,195 | 2/1929 | Centeno | 350/285 |
| 2,040,677 | 5/1936 | Suits | 331/154 |
| 2,982,179 | 5/1961 | Lace | 350/285 |
| 3,343,451 | 9/1967 | Durocher | 350/285 |
| 3,349,174 | 10/1967 | Warschauer | 350/285 |
| 3,671,766 | 6/1972 | Howe | 350/6 |

Primary Examiner—Ronald L. Wibert
Assistant Examiner—Michael J. Tokar
Attorney, Agent, or Firm—Weingarten, Maxham & Schurgin

[57] ABSTRACT

A linear bidirectional scanning system wherein a constant rate bidirectional scan is produced by a rotationally suspended scanning mirror caused to oscillate in response to alternate torque impulses applied to the mirror by two electromagnetically excited resilient plungers. A low friction pivot suspension allows the mirror to glide or rotate without applied torque at a constant rate between torque impulses. At the limit of each glide, the scanning mirror is rapidly reversed by the torque impulse from the resilient plunger.

7 Claims, 3 Drawing Figures

BALLISTIC LINEAR BIDIRECTIONAL SCANNER SYSTEM

FIELD OF THE INVENTION

This invention relates generally to mirror scanning systems and particularly to a linear bidirectional scanning system wherein mirror scanning motion is induced by alternate, oppositely directed torque impulses.

BACKGROUND OF THE INVENTION

Scanning systems for displaying representations of radiation from scanned objects have become significant monitoring and research tools in commerce and industry. Of rapidly increasing significance are those scanning systems which are capable of detecting low level infrared radiation incident over a particular field of view and converting such infrared radiation into a sequence of electrical signals which in turn are applied to a display, such as a cathode-ray-tube, to create a visual representation of the detected radiation. A particular importance of such infrared scanning system lies in their capacity to passively detect properties of a remote object.

The function of scanning has previously been accomplished in diverse ways, often with a multiplicity of problems and disadvantages, among which are mechanical delicacy, slow scan rates and other mechanical limitations which distort or cause flicker in the display of the object scanned. Mechanisms needed to minimize these disadvantages are often complex and expensive.

As will become manifest, the objects of economy, simplicity and mechanical efficiency have been of significant motivation in the present invention in order to make precision infrared scanning more widely and inexpensively available.

SUMMARY OF THE INVENTION

In accordance with a preferred embodiment of the invention, an optical scanning system provides linear bidirectional scanning of infrared or other radiation incident over a field of view. A scanning mirror is rotationally supported and caused to oscillate through a predetermined angle at constant rates by application of torque impulses at the rotational limits of the scanning mirror. A low friction pivot bearing for the mirror allows it to glide at a constant rate without drive between torque impulses, thereby greatly simplifying the mirror drive system.

The torque impulses are provided by high elasticity, resilient plungers that are electromagnetically actuated at respective rotational limits to strike the mirror and produce a short torque impulse of predetermined force. Each impulse, produces a rapid reversal in rate and direction of the scanning mirror, setting it in a glide to the opposite rotational limit where it is in turn "bounced" back. Associated circuitry for electromagnetically activating the plungers can provide different scanning rates and has an inherent stability against undesired perturbations in rate. When employed with a display system for two-dimensional radiation imaging, the novel scanning system eliminates the necessity for electronic processing to compensate for variation in scan speed within a single scan.

DESCRIPTION OF THE DRAWINGS

These and other features of the invention will be more fully understood by reference to the following detailed description of a preferred embodiment presented for purposes of illustration, and not by way of limitation, and to the accompanying drawings of which.

DETAILED DESCRIPTION OF THE PREFERRED EMBODIMENT

Figure 1:
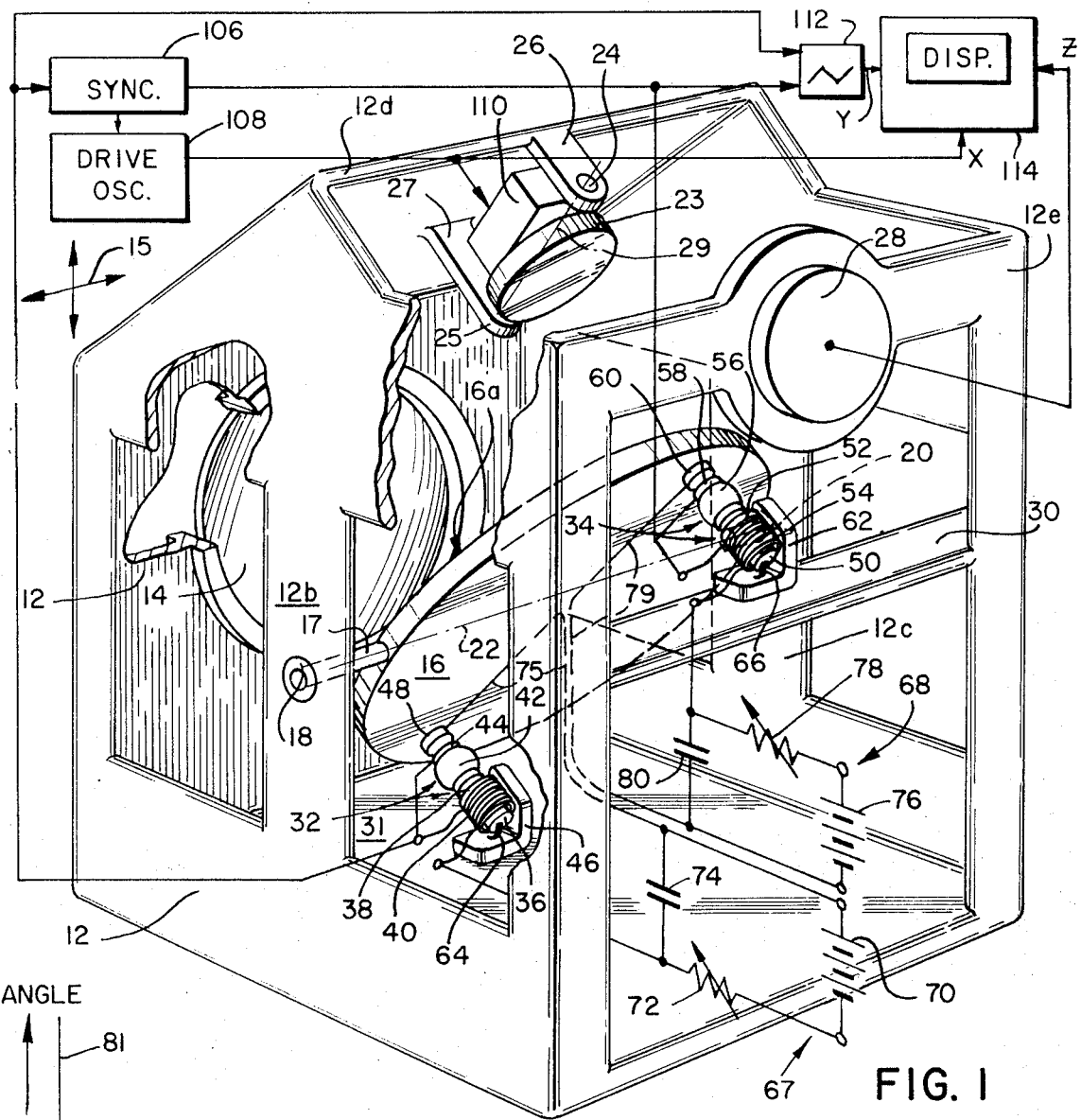
FIG. 1 shows a partially broken-away pictorial and schematic representation of an implementation of the invention.

With reference now to FIG. 1, there is shown a pictorial view of a scanning system according to the invention comprising an exterior frame 12 which is partially broken-away to provide a view of internal mechanisms of the scanner. Disposed approximately in the middle of a front, vertical wall of the frame 12 is a lens 14 which receives radiation from a field of view 15 and converges the radiation toward a reflecting surface 16a of a frame scanning mirror 16. Mirror 16, is pivotally mounted through shafts 17 to frame 12 by means of two low-friction bearings 18 and 20, set into portions 12b and 12c of vertical side walls of the frame 12 to allow for rotation of mirror 16 about an axis 22 parallel with the reflecting surface 16a. The reflecting surface 16a is normally oriented to reflect radiation upward toward an oscillatory line scanning mirror 23 located above mirror 16 and secured out from a slanted top portion 12d of frame 12. Mirror 23 is pivotally secured to portion 12b through bearings 24 and 25 set in respective arms 26 and 27 extending from portion 12d and oriented at such an angle as to be able to redirect radiation from mirror 16 toward an infrared detector 28 facing mirror 23 on a vertical back wall 12e. The rotational axis 29 of mirror 23 is orthogonal to the rotational axis 22 of mirror 16 to cooperate in producing two-dimensional line and frame scanning of radiation incident within the field of view 15.

Mounted to support bar 30 crossing frame 12 between vertical walls 12b and 12c, and to frame floor portion 31, are respective electromagnetically actuable plunger mechanisms 32 and 34. Plunger mechanism 32 comprises a magnetically attractive, cylindrical plunger 36 slidably positioned within a coilform 38 having a coil 40 wound thereon. A small, barrel shaped tip 42 of material such as a high resiliency rubber is cemented to one end of the plunger 36 and has an electrical contact 44 attached to an outer end thereof. The coilform 38 is secured through an angle bracket 46 to the floor 31 and oriented such that the plunger contact 44 confronts the reverse side of mirror 16 at a point perpendicularly removed from the axis 22 where a contact 48 is cemented. Coilform 38 is oriented so that plunger 36 slides within it in a direction perpendicular to the reverse side of mirror 16 with contacts 44 and 48 facing each other.

Plunger mechanism 34 is similarly composed of a magnetically attractive plunger 50 slidable within a coil 52 and coilform 54. A high resiliency barrel shaped tip 56 and an electrical contact 58 are secured in that order to an end of the plunger 50 as indicated for plunger 36. Contact 58 confronts the reverse surface of mirror 16 at a point having a contact 60 which is opposite axis 22 from contact 48 a distance equal to the off axis distance of contact 48. An angle bracket 62 mounts the coilform 54 to bar 30 so as to orient plunger 50 for sliding motion substantially perpendicular to the reverse surface of mirror 16 when contacts 58 and 60 touch.

Contacts 44 and 58 constrain rotation of mirror 16 to a predetermined frame scan angle within which convergent radiation from the field of view 15 is reflected toward line scanning mirror 23. Spring metal strips 64 and 66 resiliently restrain respective plungers 36 and 50 so that contacts 44 and 58 are withdrawn away from the reverse surface of mirror 16.

Electrical activation of coils 40 and 52 causes the contacts 44 and 58 to be respectively impelled a short distance toward the mirror 16. Electrical activation is achieved through respective circuits 67 and 68. Circuit 67 comprises a battery or other voltage source 70 from which a variable resistor 72 leads to a capacitor 74 that conducts back to the common side of battery 70. One side of capacitor 74 is electrically connected to one side of coil 40. The other side of coil 40 is connected to contact 44. Contact 48 is connected to the other side of capacitor 74 through flexible lead 75.

Electrical circuit 68 similarly comprises a battery 76 feeding current through a variable resistor 78 to a capacitor 80 and back to a common terminal of battery 76. In electrical circuit 68 the terminal of battery 76 in common with one terminal of capacitor 80 is connected to contact 60 through a flexible lead 79. Contact 58 is connected to one terminal of coil 52 with the other terminal of coil 52 connected to the junction of capacitor 80 with variable resistor 78.

Electrical circuits 67 and 68 operate with coils 40 and 52, plungers 36 and 50, and contacts 44, 48, 58 and 60 to cause mirror 16 to rotationally oscillate about axis 22. When rotation of mirror 16 causes contacts 44 and 48 to touch, the charge stored in capacitor 74 will produce a current surge through coil 40 thereby causing plunger 36 to become electromagnetically impelled against the mirror 16 to reverse its rotational direction. The high resiliency of tip 42 on plunger 36 aids in rapidly reversing rotation of mirror 16 and directing it onto an oppositely directed rotational path without excessive shock or vibration. Mirror 16 will then rotate about its axis 22 away from plunger 36 until contacts 58 and 60 come together. At that point current will surge through coil 52 from capacitor 80 to again reverse the rotation of mirror 16, in a similar manner as indicated above.

Figure 2:
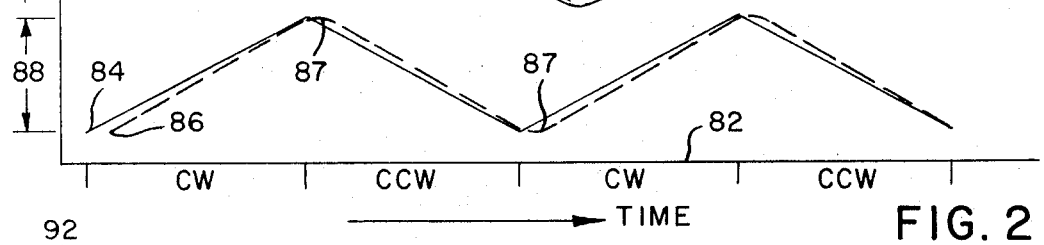
FIG. 2 shows a graphic representation of the angle versus time characteristics of the scanning mirror.

With reference now to FIG. 2, therein is disclosed a graphical representation of the motion of the scan mirror 16. Axis 81 represents the angular position of mirror 16 within angular range 88, while axis 82 represents the time. Curve 84 indicates the mirror motion which would result in a perfect scan while curve 86 indicates the acutal mirror motion of the scanning mirror 16.

It can be seen that while the actual motion curve 86 is not completely coincident with ideal curve 84, the actual motion of the mirror 16 between rotation reversals is substantial linear. A sufficiently large ratio of moment of inertia in mirror 16 to friction in bearings 18 and 20 insures that there will be a negligible momentum loss in rotation of mirror 16 through angle 88 in FIG. 2. Such a ratio is readiy achieved with state of the art low friction bearings. Rotation reversal in curve 86, while not perfectly instantaneous, is sufficiently rapid as to affect only a small, neglible portion 87 of curve 86. By matching batteries 70 and 76 and capacitors 74 and 80, and/or properly adjusting of the variable resistors 72 and 78 the alternating linear portions of curve 86 are given preferable equal slopes.

In steady state operation, the linear portions of curve 86 will have a predetermined slope determined by properties of the mirror 16, plunger mechanisms 32 and 34 and circuits 67 and 68. The angular momentum imparted to mirror 16 by each thrust from an appropriate plunger mechanism will vary in accordance with the charged stored in capacitors 74 and 80, all other factors being equal. The capacitors 74 and 80 are in turn being charged from sources 70 and 76 through respective resistors 72 and 78 according to the known exponential charge law. Thus, the charge which the capacitors assume will be governed by the charging time, or the time between two reversals of mirror 16 when the same contacts are closed, assuming for simplicity nearly complete discharge of the capacitors with each contact closure. From the above it can be seen that the oscillation rate of the mirror 16 is self stabilizing to the extent that any tendency to increase the rate, reduces the charging time and consequently reduces the mirror return torque impulse so that the tendency to increase the rate of oscillation is counter balanced and the rate stabilized. An oppositely acting increase in torque is applied if the mirror tends to slow down.

Figure 3:
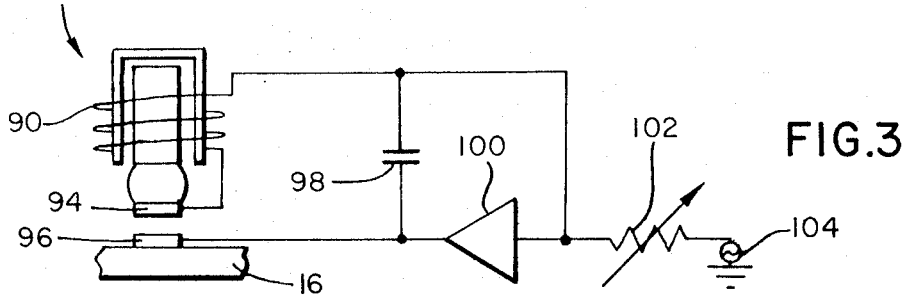
FIG. 3 shows a schematic and block diagram representation of an alternative implementation of the invention.

Variations in this stabilizing effect can be produced using circuitry of FIG. 3 to control the relationship between charge and time. A coil 90 of a plunger mechanism 92 is connected by one terminal into a circuit through plunger and mirror contacts 94 and 96 respectively. Contact 96 is connected to one terminal of a capacitor and the other terminal thereof is connected to the other end of coil 90. Capacitor 98 forms the feedback capacitor of an operational amplifier 100. A variable resistor 102 connects the input of amplifier 100 to a voltage source 104.

The circuit of FIG. 3 operates to produce a linear increase in charge on capacitor 98 with time, rather than the exponential asymptotic behavior of an RC circuit described above which greatly reduces the charge rate near maximum charge. Additional reactive or nonlinear elements can be introduced into the circuit of FIG. 3 across amplifier 100 or capacitor 98 to further alter the charge characteristics as desired.

Returning to FIG. 1, synchronization between the scanning mirrors 16 and 23 may be provided by a synchronizing circuit 106 which detects each current surge through the coil 52 at contact 58 and coil 40 at contact 44 and provides a trigger pulse to a drive oscillator 108 which in turn directs an oscillatory driver signal, synchronized to each reversal of mirror 16, to a driver mechanism 110 for mirror 23. The drive mechanism 110 may be of conventional design.

A further oscillator 112 receives the signals from contacts 44 and 68 to produce a linear drive signal, alternating in slope with each reversal of mirror 16 for vertical deflection of a display 114. Horizontal deflection of display 114 is controlled by a signal from the oscillator 108, and the display is intensity modulated by a signal from detector 28.

Having above described preferred embodiments of the present invention, it will occur to those skilled in the art that modifications and alterations can be made in the disclosed structure without departing from the spirit and scope of the invention. In particular, while indicated for use in a frame scanning system, the invention may be used to achieve any scanning motion. It is accordingly intended to limit the scope of the invention only as indicated in the following claims.

What is claimed is:

1. A linear scanning system operative to bidirectionally scan radiation incident on said system over a field of view and comprising:
   means for redirecting radiation received from said field of view;
   means for supporting said redirecting means for ballistic rotation about an axis through a rotational angle and providing a low frictional restraint to rotation of said redirecting means, whereby the ballistic rotation rate of said redirecting means is generally maintained through said rotation angle;
   a rotation cycle being defined as two complete traversals through said rotation angle in opposed directions by said redirecting means;
   an electromagnetic transducer including plunger means disposed at at least one angular limit of said rotation angle to contact said redirecting means at said at least one limit and operative to reverse the rotation of said redirecting means by applying a torque impulse to said redirecting means during contact therewith over a time interval which is a small fraction of the rotation cycle of said redirecting means, thereby to provide ballistic scanning by said redirecting means over substantially all of said rotation cycle;
   first and second electrical contacts mounted on a reverse surface of said redirecting means and positioned along a line orthogonal to said axis;
   said plunger means comprising:
      first and second electrical coils having the respective axes thereof generally directed toward said first and second electrical contacts;
      first and second plungers slidably mounted within said first and second electrical coils respectively;
      said plungers being responsive to the application of electrical excitation to said coils to cause said plungers to be impelled toward said first and second contacts;
      third and fourth contacts respectively secured to said first and second plungers on ends which respectively confront said first and second contacts, whereby said third and fourth contacts are operative to alternately contact said first and second contacts during oscillation of said redirecting means;
   said electromagnetic transducer including:
      first means for applying electrical excitation to said first coil in response to electrical contact between said first and third contacts thereby to cause rotation of said redirecting means away from said first coil toward said second coil; and
      second means for applying electrical excitation to said second coil in response to electrical contact between said second and fourth contacts thereby to cause rotation of said redirecting means away from said second coil toward said first coil.

2. The linear scanning system of claim 1 further including means for retaining said first and second plungers in a retracted position within said first and second coils in the absence of electrical excitation to said coils.

3. The linear scanning system according to claim 1 further including first and second resilient pads secured respectively between said third contact and the end of said first plunger and between said fourth contact and the end of said second plunger, said first and second pads providing a mechanical aid in the reversal of the rotation of said redirecting means.

4. The linear scanning system according to claim 1 wherein said first and second means for applying electrical excitation to said first and second coils include:

first and second capacitors; and means for charging said first and second capacitors;
   said first capacitor being serially connected with said first coil, said first contact and said third contact to cause discharge of said first capacitor through said first coil when said first and third contacts touch;

said second capacitor being serially connected with said second coil, said second contact and said fourth contact to cause discharge of said second capacitor through said second coil when said second and fourth contacts touch.

5. A linear scanning system operative to bidirectionally scan radiation incident on said system over a field of view and comprising:
   means for redirecting radiation received from said field of view;
   means for supporting said redirecting means for ballistic rotation about an axis through a rotational angle and providing a low frictional restraint to rotation of said redirecting means, whereby the ballistic rotation rate of said redirecting means is generally maintained through said rotation angle;
   a rotation cycle being defined as two complete traversals through said rotation angle in opposed directions by said redirecting means;
   an electromagnetic transducer including plunger means disposed at at least one angular limit of said rotation angle to contact said redirecting means at said at least one limit and operative to reverse the rotation of said redirecting means by applying a torque impulse to said redirecting means during contact therewith over a time interval which is a small fraction of the rotation cycle of said redirecting means, thereby to provide ballistic scanning by said redirecting means over substantially all of said rotation cycle;
   said electromagnetic transducer including:
      means for moving said plunger means in response to a signal;
      stabilizing means for producing a torque impulse which increases in magnitude with the interval between torque impulses;
      a capacitor;
      means for electrically charging said capacitor with time; and
      means for discharging said capacitor to supply said current to said means for moving said plunger means in response to said redirecting means being sensed at said at least one angular limit in the rotation thereof.

6. The linear scanning system of claim 5 wherein said means for electrically charging said capacitor provides a charge linearly increasing with time.

7. A linear scanning system operative to bidirectionally scan incident radiation over a field of view, and comprising:

a frame;

a mirror having a reflecting surface;

low frictional restraint bearings for rotationally supporting said mirror in said frame for ballistic rotation of said mirror through a rotation angle about an axis generally parallel to the reflecting surface of said mirror and whereby the ballistic rotation rate of said mirror is generally maintained through said rotation angle;

a rotation cycle being defined as two complete traversals through said rotation angle in opposed directions by said mirror;

first and second electrical contacts mounted to said mirror;

third and fourth electrical contacts respectively secured to alternately contact said first and second contacts during oscillation of said mirror;

first and second electrically actuable plunger mechanisms, disposed at first and second angular limits of said rotation angle and operative to provide torque impulses to said mirror at said first and second limits;

said torque impulses being applied to said mirror over a time interval which is a small fraction of the rotation cycle of said mirror, thereby to provide ballistic scanning by said mirror over substantially all of said rotation cycle;

said plunger mechanisms including:

first and second electrical coils mounted to said frame, the respective axes thereof intercepting said mirror at points a set distance from said axis;

first and second plunger members slidably mounted within said first and second electrical coils respectively;

first and second high resiliency cushions secured respectively to said first plunger member and said second plunger member on ends which respectively confront said mirror at said points a set distance from said axis, said cushions being operative to aid in reversing rotation of said mirror; and said first and second plunger members being responsive to the application of electrical excitation to said coils to be impelled toward said mirror; and first and second electrical circuits, operative to apply electrical excitation to said first and second coils, said circuits including:

first and second capacitors;

means for charging said first and second capacitors;

means for interconnecting said first capacitor with said first coil and said first and third contacts to discharge said first capacitor through said first coil in response to touching of said first and third contacts; and means for interconnecting said second capacitor with said second coil and said second and fourth contacts to discharge said second capacitor through said second coil in response to touching of said second and fourth contacts.

* * * * *